United States Patent [19]

Fraley, Jr.

[11] Patent Number: 5,230,273
[45] Date of Patent: Jul. 27, 1993

[54] APPARATUS FOR CONTROLLING FLUID FLOW TO A POWER STEERING ACTUATOR

[75] Inventor: Richard R. Fraley, Jr., Allenton, Mich.

[73] Assignee: TRW Inc., Lyndhurst, Ohio

[21] Appl. No.: 558,068

[22] Filed: Jul. 25, 1990

[51] Int. Cl.[5] ............................................. F15B 9/10
[52] U.S. Cl. ................................. 91/371; 91/375 A; 180/143
[58] Field of Search ............ 91/370, 371, 374, 375 R, 91/375 A, 382; 29/890, 124; 74/132; 180/141, 143

[56] References Cited

U.S. PATENT DOCUMENTS

| | | | |
|---|---|---|---|
| 4,502,504 | 3/1985 | Okada et al. | 180/143 |
| 4,793,433 | 12/1988 | Emori et al. | 91/375 A |
| 4,819,545 | 4/1989 | Dymond | 91/375 A |
| 4,823,839 | 4/1989 | Rayner | 91/375 A |
| 4,877,100 | 10/1989 | Emori et al. | 180/143 |
| 4,966,192 | 10/1990 | Umeda | 91/375 A |

FOREIGN PATENT DOCUMENTS

| | | | |
|---|---|---|---|
| 2825383 | 12/1978 | Fed. Rep. of Germany | 91/375 R |
| 2044697 | 10/1980 | United Kingdom | 91/375 A |
| 2212463A | 11/1987 | United Kingdom | |

Primary Examiner—Edward K. Look
Assistant Examiner—Hoang Nguyen
Attorney, Agent, or Firm—Tarolli, Sundheim & Covell

[57] ABSTRACT

A power steering control valve assembly includes inner and outer valve members and a force transmitting assembly which resists relative rotation between the valve members. The force transmitting assembly includes an upper reaction element which is connected with the inner valve member, a lower reaction element which is connected with the outer valve member and a plurality of force transmitting elements or balls which are disposed between the upper and lower reaction elements. The balls engage recesses in the inner valve member and rotate with the inner valve member. The balls also engage recesses formed in the lower reaction element. In one embodiment of the invention, only three balls are utilized. Hydraulic and mechanical balancing of the power steering control valve is attained by hydraulically balancing the inner and outer valve members before connecting the lower reaction element with the outer valve member. Thus, the lower reaction element is loosely positioned relative to the outer valve member. The upper reaction element urges the balls against the lower reaction element to accurately locate the lower reaction element relative to the inner valve member. The outer valve member and the lower reaction element are then interconnected by deforming a portion of the outer valve member.

14 Claims, 7 Drawing Sheets

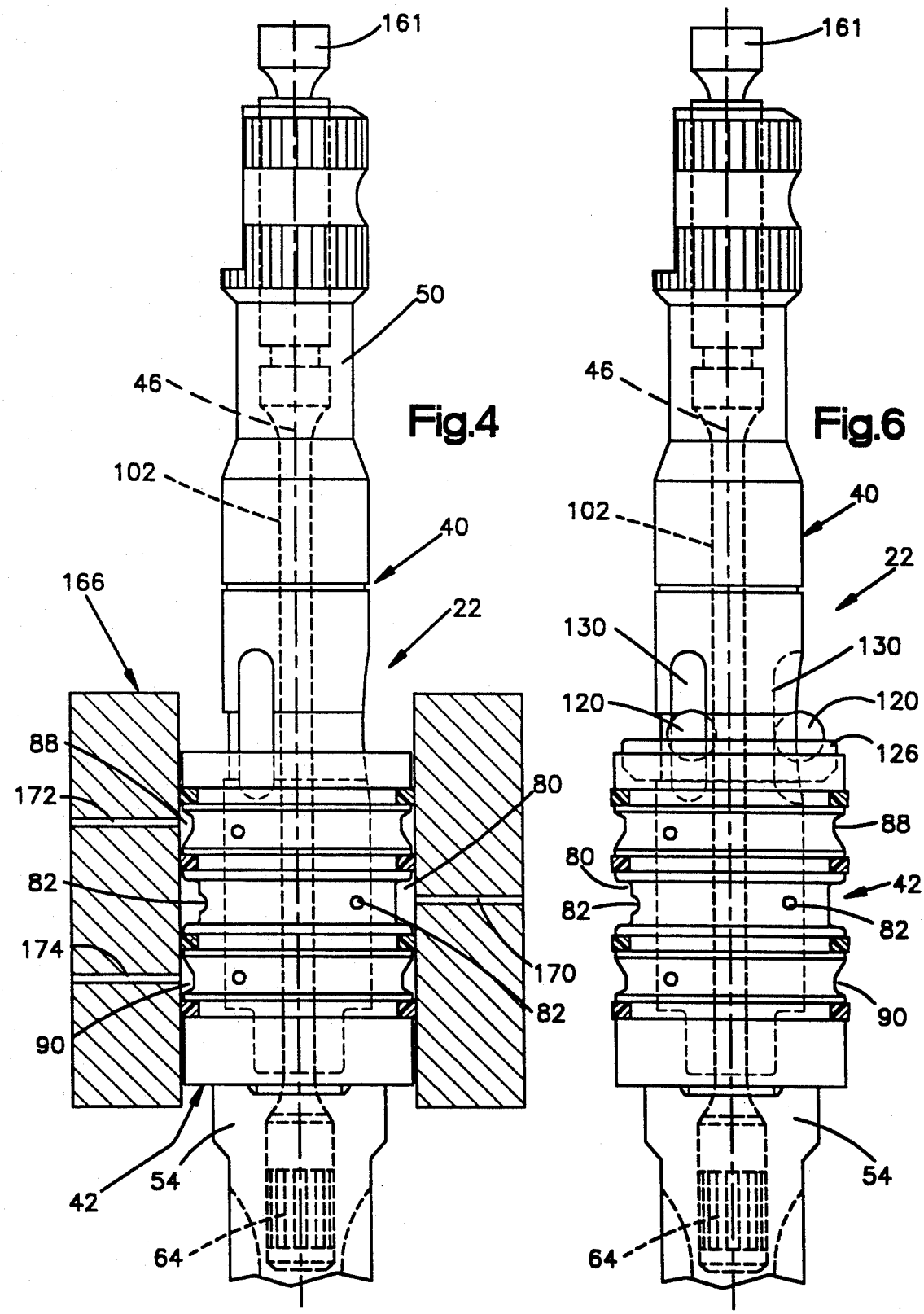

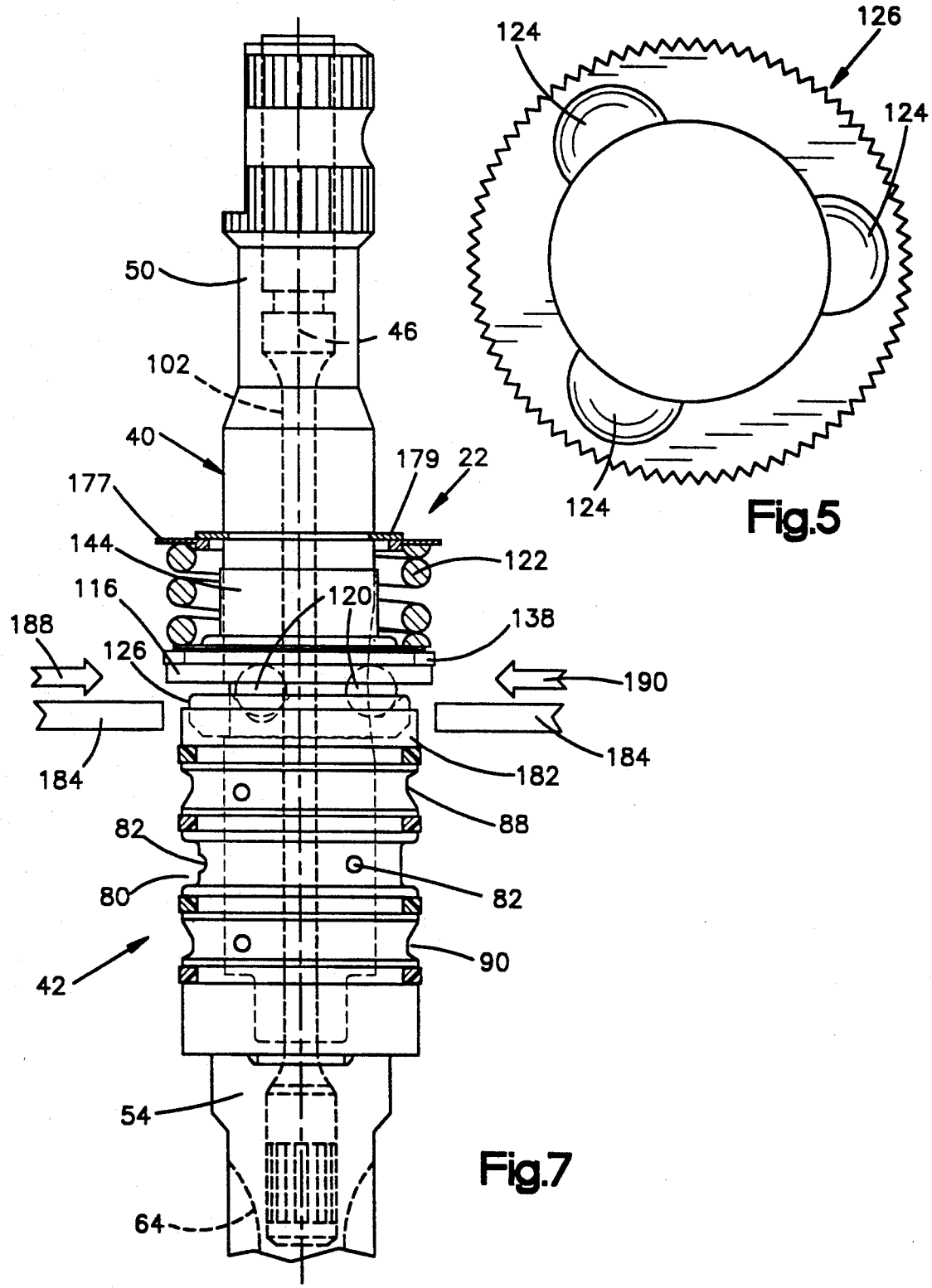

APPARATUS FOR CONTROLLING FLUID FLOW TO A POWER STEERING ACTUATOR

BACKGROUND OF THE INVENTION

The present invention relates to a new and improved power steering control valve, and more specifically, to a power steering control valve which is hydraulically balanced and has a mechanically balanced force transmitting assembly which resists relative rotation between inner and outer valve members.

A power steering control valve having a force transmitting assembly which resists relative rotation between inner and outer valve members with a force which varies as a function of vehicle speed is disclosed in U.S. Pat. No. 4,819,545, issued Apr. 11, 1989 and entitled "Power Steering System". The power steering control valve disclosed in this patent includes an upper reaction element which presses a plurality (four) balls against a reaction surface formed as part of a one piece outer valve member. The upper reaction element is held against rotation relative to the inner valve member by a pair of force transmitting elements or balls. Thus, the power steering control valve illustrated in the aforementioned U.S. patent requires six force transmitting elements or balls which engage accurately located recesses in the inner valve member, the upper reaction element, and the outer valve member.

During operation of a power steering control valve, such as the power steering control valve disclosed in the aforementioned U.S. patent, it is desirable to have the valve hydraulically balanced so that equal fluid pressures are conducted to a power steering actuator in response to equal clockwise and counterclockwise actuation of the valve members relative to each other from an initial position. It is also desirable to have the force with which the force transmitting assembly resists relative rotation between the inner and outer valve members be equal for equal displacements clockwise and counterclockwise of one of the valve members relative to the other valve member.

The obtaining of both hydraulic pressure and mechanical force balancing of the power steering valve disclosed in the aforementioned U.S. patent requires that the components of the valve be accurately made. If a slight inaccuracy occurs in the making of the inner and outer valve members or the reaction element so that the initial position of the inner and outer valve members relative to each other has to be adjusted slightly from an intended initial position, it is impossible to adjust the position of the force transmitting assembly relative to the inner and outer valve members to obtain a mechanical balance at the adjusted initial position. This is because the relationship between the components of the force transmitting assembly cannot be adjusted relative to the valve members.

SUMMARY OF THE INVENTION

The present invention relates to a new and improved apparatus for controlling fluid flow to a power steering actuator in a vehicle. The apparatus includes a valve assembly having inner and outer valve members which are rotatable relative to each other. A force transmitting assembly is provided to resist relative rotation between the inner and outer valve members. The force transmitting assembly includes a plurality of force transmitting elements which engage recesses in an inner valve member and recesses connected with the outer valve member. Upon relative rotation between the inner and outer valve members, the force transmitting elements remain in engagement with the recesses in the inner valve member and move part way out of the recesses connected with the outer valve member.

The valve assembly of the present invention requires a minimum of force transmitting elements or balls. This is because each of the force transmitting elements performs the dual functions of resisting relative rotation between the valve members and positioning the valve members relative to each other when the valve assembly is in an unactuated condition.

To enable the valve assembly to be both hydraulically and mechanically balanced, the recesses which are connected with the outer valve member are formed in a separate reaction element. After the inner and outer valve members have been hydraulically balanced to accurately locate an initial position, the reaction element is loosely positioned relative to the inner valve member. The force transmitting elements are then urged against recesses in the reaction element. This cams the reaction element into a position corresponding to the initial position at which the inner and outer valve members are hydraulically balanced. The outer valve member is then deformed to grip the reaction element and hold it against movement relative to the outer valve member.

BRIEF DESCRIPTION OF THE DRAWINGS

The foregoing and other features of the present invention will become more apparent to one skilled in the art upon a consideration of the following description taken in connection with the accompanying drawings, wherein:

FIG. 4 is a schematic illustration depicting the manner in which the inner and outer valve members of FIG. 3 are placed in a fixture to locate a central position at which the inner and outer valve members are hydraulically balanced;

FIG. 5 is a top plan view illustrating recesses formed in a lower reaction element;

FIG. 6 is an elevational view illustrating the lower reaction element loosely positioned in a recess in the outer valve member with force transmitting elements disposed in recesses in the lower reaction element and in the inner valve member prior to connection of the lower reaction element with the outer valve member;

FIG. 7 is an elevational view, generally similar to FIG. 6, illustrating the manner in which the upper reaction element urges the force transmitting elements into recesses in the lower reaction element and inner valve member;

DESCRIPTION OF ONE SPECIFIC PREFERRED EMBODIMENT OF THE INVENTION

Power Steering System—General Description

Figure 1:
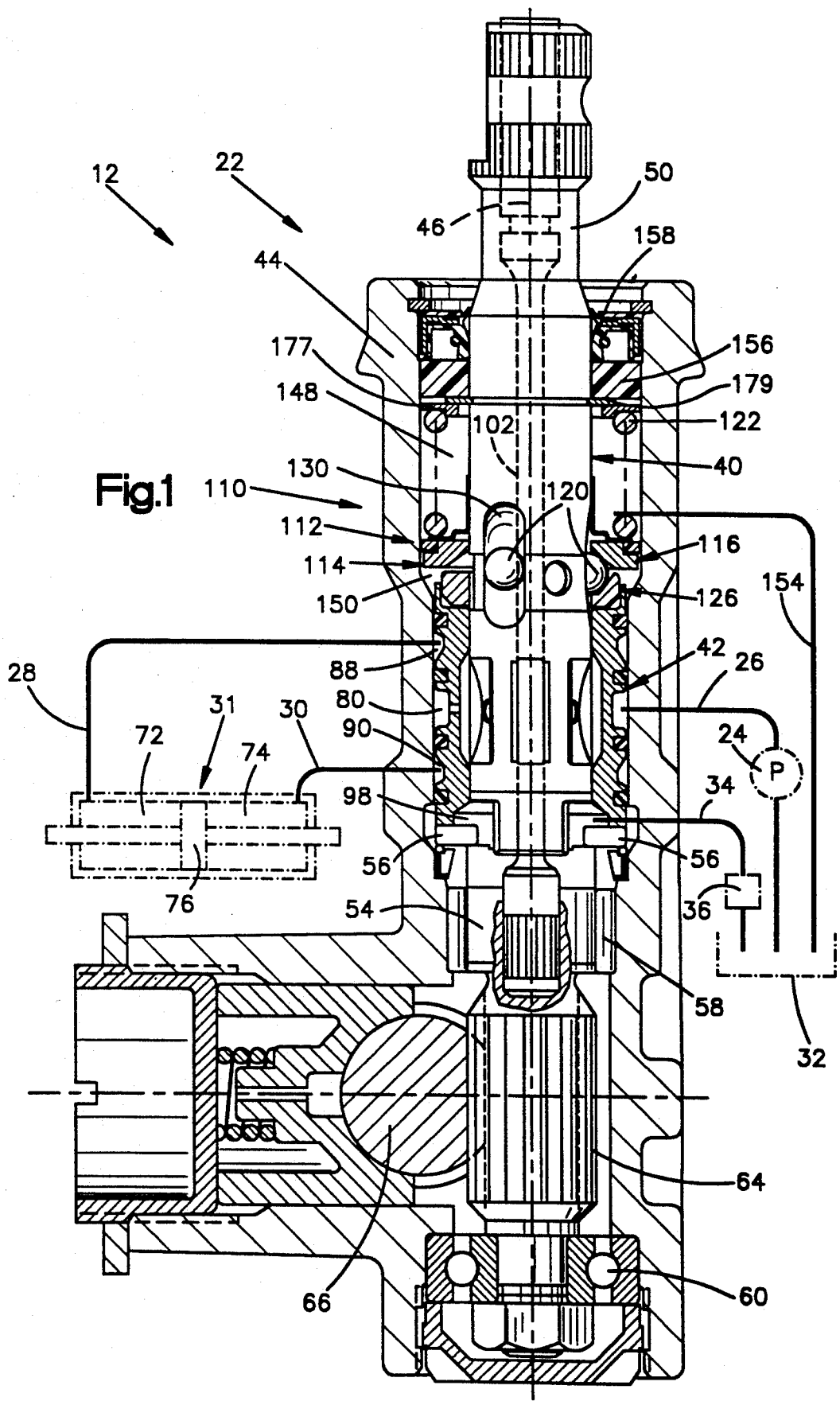
FIG. 1 is a sectional view of a power steering valve assembly constructed in accordance with the present invention.

A vehicle power steering system 12 (FIG. 1) is operable to turn steerable vehicle wheels (not shown) upon rotation of a steering wheel (not shown) by an operator of a vehicle. Rotation of the steering wheel actuates a power steering control valve 22 to port fluid from an engine driven pump 24 and supply conduit 26 to either one of a pair of actuator conduits 28 and 30. The high pressure fluid conducted from the supply conduit 26 through one of the actuator conduits 28 or 30 effects operation of the actuator 31 to turn the steerable vehicle wheels in a known manner. Fluid is conducted from the actuator 31 to a reservoir 32 through the other one of the actuator conduits 28 or 30, the power steering control valve 22, return conduit 34 and a speed responsive control unit 36.

The power steering control valve 22 includes a first or inner valve member 40 and a second or outer valve member 42. The outer valve member 42 is cylindrical and encloses the inner valve member 40. The inner valve member 40 and outer valve member 42 are rotatable relative to each other and to a housing 44 about a common central axis 46.

The inner valve member 40 is formed as one piece with a cylindrical input member or valve stem 50 (FIG. 1) which is connected with the steering wheel. The one piece outer valve member 42 is connected with a follow-up member 54 by pins 56. The follow-up member 54 is rotatably supported in the housing 44 by bearings 58 and 60. A pinion gear 64 is formed on the follow-up member 54. The pinion gear 64 is disposed in meshing engagement with a rack 66. The rack 66 is connected with the power steering actuator 31 and steerable vehicle wheels.

The power steering control valve 22 is of the known open-center type. Therefore, when the power steering control valve is in an unactuated position, fluid pressure from the pump 24 is conducted through the actuator conduits 28 and 30 to actuator cylinder chambers 72 and 74 on opposite sides of a piston 76 in the power steering actuator 31. Fluid flow is conducted from the power steering control valve 22 to the reservoir 32 through the return conduit 34.

The power steering control valve 22 is pressure balanced. Therefore, equal fluid pressures are present in the actuator cylinder chambers 72 and 74 when the power steering control valve 22 is in the unactuated condition.

Upon rotation of the steering wheel (not shown) and rotation of the valve stem 50, the inner valve member 40 is rotated about the axis 46 relative to the housing 44 and outer valve member 42. This directs high pressure fluid from the pump 24 to one of the actuator conduits 28 or 30 and directs fluid from the other actuator conduit to the reservoir 32. Since the power steering control valve 22 is pressure balanced, equal amounts of rotation of the steering wheel in opposite directions from the initial position results in the same relatively high fluid pressure being conducted through the actuator conduits 28 and 30 to actuator cylinder chambers 72 and 74, respectively.

Rotation of the inner valve member 40 in one direction relative to the outer valve member 42 will reduce the extent of communication of the actuator conduit 28 with the reservoir 32 and increase the extent of communication of the actuator conduit 28 with the pump 24. This results in high pressure fluid from the pump 24 being conducted to the actuator cylinder chamber 72. This high fluid pressure moves the piston 76 toward the right (as viewed in FIG. 1). As the piston 76 moves toward the right, fluid discharged from the chamber 74 is conducted to the reservoir 32 through the actuator conduit 30 and return conduit 34.

Similarly, rotation of the inner valve member 40 through the same distance in the opposite direction relative to the outer valve member 42 will reduce the extent of communication of the actuator conduit 30 with the reservoir 32 and increase the extent of communication of the actuator conduit 30 with the pump 24. This results in the same relatively high fluid pressure being conducted from the pump 24 to the actuator cylinder chamber 74 as was previously conducted to the actuator cylinder chamber 72 upon rotation of the steering wheel in the other direction. The relatively high fluid pressure in the actuator cylinder chamber 74 moves the piston 76 toward the left (as viewed in FIG. 1). As the piston 76 moves toward the left, fluid discharged from the chamber 72 is conducted to the reservoir 32 through the actuator conduit 28 and return conduit 34.

As the power steering actuator 31 operates, the rack 66 rotates the pinion gear 64 and follow-up member 54. This rotates the outer valve member 42 relative to the inner valve member 40. As the power steering actuator 31 is operated to turn the steerable vehicle wheels to an extent corresponding to the extent of rotation of the inner valve member 40, the rack 66 rotates the pinion 64 through a distance sufficient to move the outer valve member 42 to its central position relative to the inner valve member. When this occurs, the fluid pressure in the actuator cylinder chambers 72 and 74 equalizes and the actuator 31 stops operating.

When the power steering control valve 22 is in the initial position, fluid pressure from the pump 24 is conducted to an annular central groove 80 (FIGS. 1 and 2) formed in the outer valve member 42. Fluid flows from the groove 80 to the inside of the cylindrical outer valve member 42 through three passages 82 (FIG. 2) spaced equal distances apart about the circumference of the groove 80. The inner valve member 40 has axially extending grooves 86 and lands 87 (FIG. 2) which cooperate with axially extending grooves 89 and lands formed inside the outer valve member 42 in a known manner. One set of grooves on the inside of the outer valve member 42 is connected in fluid communication with an annular outer groove 88 connected with the actuator conduit 28. A second set of axially extending grooves on the inside of the outer valve member 42 is connected in fluid communication with an annular outer groove 90 formed in the outer valve member and connected with the actuator conduit 30.

Openings 94 (FIG. 2) extend radially inwardly on alternate grooves 86 formed in the inner valve member 40 to an axially extending central passage in the inner valve member. The central passage is connected in fluid communication with a chamber 98 at the lower end of the outer valve member 42. The chamber 98 is connected in fluid communication with the reservoir 32 (FIG. 1) through the return conduit 34 and speed responsive control unit 36.

A torsion bar 102 is disposed in the axially extending fluid return passage formed on the central axis 46 of the inner valve member. The upper end of the torsion bar 102 is connected to the valve stem 50 and the lower end of the torsion bar is connected to the follow-up member 54. The torsion bar 102 twists to enable relative rotation to occur between the inner and outer valve members 40 and 42. When rotational force is no longer applied to the steering wheel and inner valve member 40, the torsion bar urges the inner and outer valve members 40 and 42 to their initial positions.

Power Steering Resistance Control System

A power steering resistance control system 110 (FIG. 1) controls the force which is required to actuate the power steering control valve 22 in accordance with vehicle speed. Thus, at relatively low vehicle speeds, a relatively small force is required to rotate the inner valve member 40 relative to the outer valve member 42. At relatively high vehicle speeds, a relatively larger force is required to rotate the inner valve member 40 relative to the outer valve member 42.

The power steering resistance control system 110 includes two major components, namely, a pressure responsive control unit 112 disposed in the power steering control valve housing 44 (FIG. 1) and the speed responsive control unit 36. The pressure responsive control unit 112 resists relative rotation between the inner and outer valve members 40 and 42. The speed responsive control unit 36 causes the pressure responsive control unit 112 to resist relative rotation between the inner and outer valve members 40 and 42 with a force which varies as a function of vehicle speed.

The power steering control valve 22 is hydraulically and mechanically balanced. Thus, equal relative movements between the inner and outer valve members 40 and 42 in opposite directions from a central position result in equal fluid pressures being conducted to the power steering actuator 31. In addition, the pressure responsive control unit 112 is mechanically balanced so that at constant vehicle speed, the pressure responsive control unit provides equal resistances to relative rotation between the inner and outer valve members 40 and 42 in opposite directions relative to each other. Thus, upon equal amounts of relative rotation between the inner and outer valve members 40 and 42 in opposite directions at constant vehicle speed, the hydraulic fluid pressures conducted to the power steering actuator are equal and the forces required to effect the relative rotation between the inner and outer valve members are equal.

Figure 2:
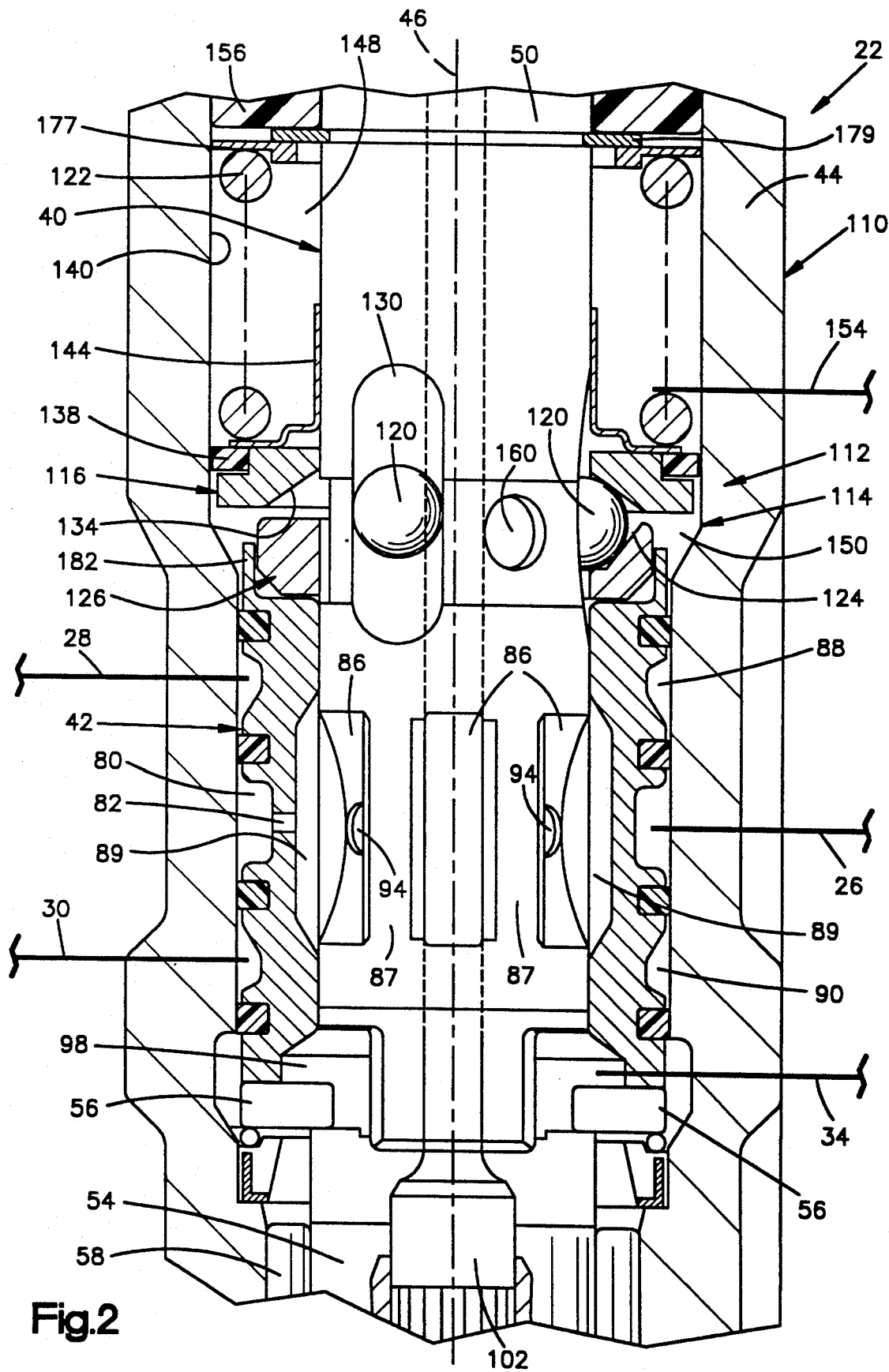
FIG. 2 is an enlarged view of a portion of the power steering valve assembly of FIG. 1.
Figure 3:
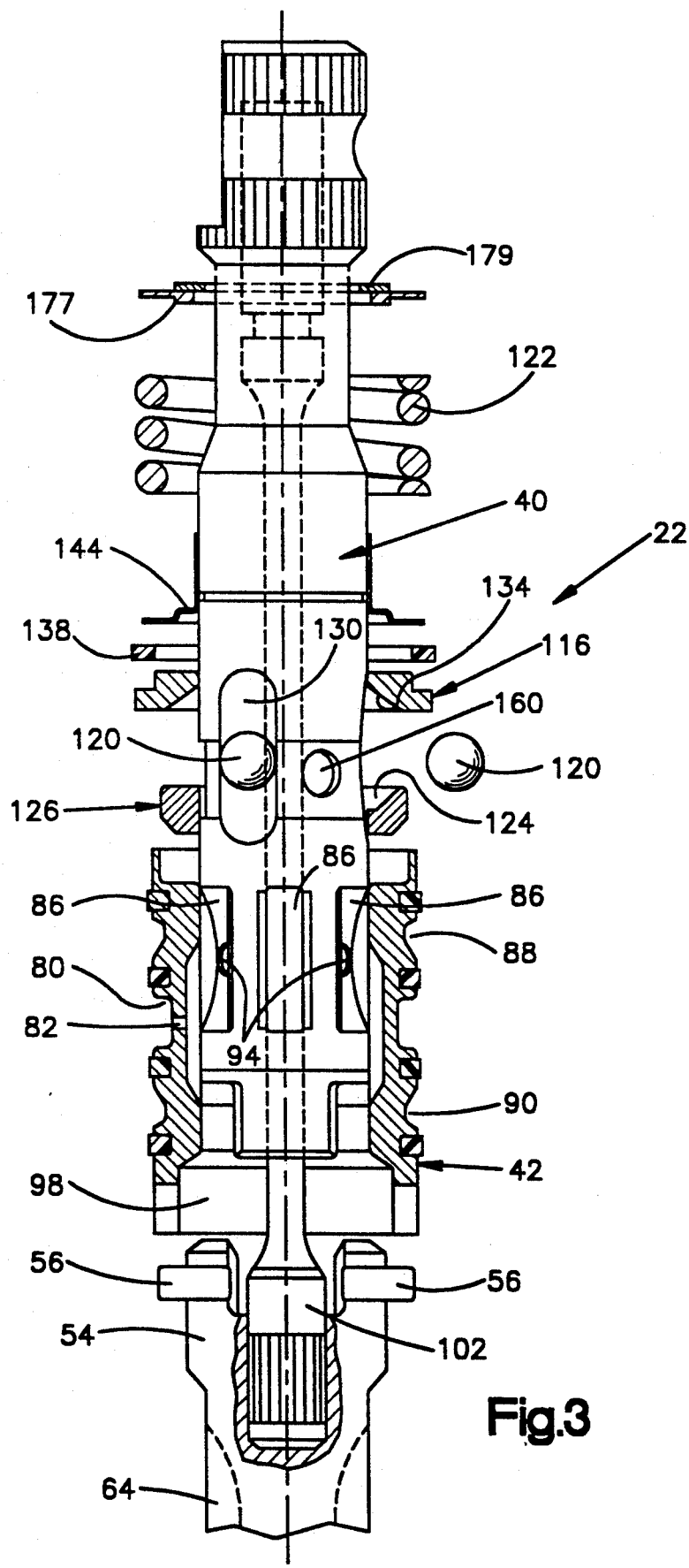
FIG. 3 is an exploded view illustrating the relationship between inner and outer valve members, a torsion spring which interconnects the inner and outer valve members, and a force transmitting assembly which resists relative rotation between the valve members.

The pressure responsive control unit 112 includes a force transmitting assembly 114 which resists relative rotation between the inner and outer valve members 40 and 42. The force transmitting assembly 114 includes an upper reaction element or disk 116 (FIGS. 1, 2 and 3). The annular upper reaction element or disk 116 is pressed downwardly against a plurality of force transmitting elements or balls 120 by a spring 122. The spherical force transmitting elements or balls 120 are forced by the upper reaction element 116 into a plurality of recesses 124 formed in a lower reaction element or disk 126 (FIGS. 2, 3 and 5). In addition to engaging the generally radially extending recesses 124 in the annular lower reaction element 126, the balls 120 engage axially extending recesses 130 (FIGS. 2 and 3) formed in the cylindrical inner valve member 40.

The lower reaction element 126 is fixedly connected with the upper end portion of the outer valve member 42. The spherical force transmitting elements or balls 120 engage recesses 124 (FIGS. 2 and 5) in the lower reaction element 126 and recesses 130 (FIGS. 2 and 3) in the inner valve member 40. Therefore, the balls 120 transmit force between the inner and outer valve members 40 and 42 to resist relative rotation between the inner and outer valve members. In the illustrated preferred embodiment of the invention, there are only three force transmitting elements or balls 120. Therefore, there are only three recesses 124 in the lower reaction element 126 and only three recesses 130 in the inner valve member 40.

Upon the occurrence of relative rotation between the inner and outer valve members 40 and 42, the force transmitting elements or balls 120 are cammed part way out of the recesses 124 in the lower reaction element 126. As this occurs, the balls 120 are moved axially upwardly (as viewed in FIG. 2) in the elongated recesses 130 formed in the inner valve member 40. As the balls 120 move upwardly in the recesses 130 in the inner valve member 40, the balls move the upper reaction element 116 upwardly against the influence of the spring 122.

The upper reaction element 116 has a continuous annular inner side surface 134 (FIGS. 2 and 3). The surface 134 is formed as a portion of a cone. The surface 134 is pressed against the spherical balls 120 to urge the balls into the arcuate recesses 124 formed in the lower reaction element 126 and recesses 130 formed in the inner valve member 40. When for the balls 120 move part way out of the recesses 124 in the lower reaction element 126, the balls must move the upper reaction element 116 upwardly against the downward force of the spring 122. This results in the balls 120 resisting relative rotation between the inner and outer valve members 40 and 42. The force with which the balls 120 resist relative rotation between the inner and outer valve members 40 and 42 is a direct function of the force urging the balls into the recesses 124 formed in the lower reaction element 126.

As the balls 120 move upwardly and part way out of the recesses 124 formed in the lower reaction element 126, the balls 120 remain in engagement with the axially extending recesses 130 formed in the inner valve member 40. Although the balls 120 move upwardly in the recesses 130, lower portions of the balls remain in the recesses in the lower force transmitting element 126. Therefore, the balls 120 are effective to transmit force directly from the force transmitting element 126 to the inner valve member 40.

The annular upper reaction element 116 carries an annular outer seal 138 (FIG. 2) which engages a cylindrical inner side surface 140 of the housing 44. In addition, an inner seal 144 engages the outer seal 138 and the inner valve member 40. The inner and outer seals 138 and 144 cooperate with the inner valve member 40 and cylindrical inner side surface 140 of the housing 44 to form a pair of annular chambers 148 and 150 on axially opposite sides of the upper reaction element 116.

The fluid pressure in the lower chamber 150 urges the upper reaction element 116 upwardly away from the lower reaction element 126, in opposition to the spring 122. The force applied by the spring 122 against the upper reaction element 116, in normal operation, is always greater than the fluid pressure force applied against the lower side of the upper reaction element 116 by the fluid in the pressure chamber 150. Therefore, the inner side surface 134 on the upper reaction element 116, during normal operation, always remains in abutting engagement with the balls or force transmitting elements 120.

It is contemplated that some fluid will leak past the outer seal 138 and inner seal 144 into the spring chamber 148 (FIG. 1). Therefore, the spring chamber 148 is connected with the reservoir 32 through a drain conduit 154. The upper end of the valve member 40 is aligned with the housing 44 by an annular bearing or bushing 156 which engages the inner side surface 140 of the housing and the outer side surface of the valve stem 50. An annular seal ring 158 is provided to ensure a fluid tight seal.

Rotation of the inner valve member 40 relative to the outer valve member 42 is resisted by the pressure responsive control unit 112. The amount of resistance provided by the control unit 112 is a function of the difference between the fluid pressure force applied to the lower side of the upper reaction element 116 by the fluid in the chamber 150 and the spring force applied against the upper side of the upper reaction element 116 by the spring 122. As the inner valve member 40 is rotated from the central position toward a fully actuated position, the outer side surfaces of the force transmitting elements or balls 120 roll on the surfaces of the recesses 124 in the lower reaction element 126. As this occurs, the balls 120 rotate with the inner valve member 40 and move upwardly in the recesses 130 in the valve member.

The force required to roll the spherical balls 120 on the side surfaces of the recesses 124 and to move the annular upper reaction element 116 away from the annular lower reaction element 126 and cylindrical lower valve member 42 varies as a function of the net force urging the upper reaction element 116 downwardly toward the lower reaction element 126. Thus, the greater the net force pressing the upper reaction element 116 against the balls 120, the greater is the force required to rotate the inner valve member 40 from the central position of FIG. 1 to actuate the power steering actuator 31. The net force pressing the upper reaction element 116 against the balls 120 is equal to the difference between the force applied by the spring 122 against the upper side of the upper reaction element 116 and the fluid pressure force applied against the lower side of the upper reaction element 116 by the fluid in the chamber 150. The greater the fluid pressure force applied against the lower side of the upper reaction element 116, the smaller is the force which must be overcome to rotate the inner valve member 40 and balls 120 relative to the outer valve member 42 and lower reaction element 126.

The power steering resistance control system 110 includes the speed responsive control unit 36. The speed responsive control unit 36 is operable to vary the fluid pressure in the chamber 150 of the pressure responsive control unit 112 with changes in vehicle speed. The speed responsive control unit 36 is connected in fluid communication with the chamber 150 of the pressure responsive control unit 112 by the return conduit 34, the axially extending passage in the inner valve member 40, and radially extending passages 160 (FIG. 2) in the inner valve member 40.

The speed responsive control unit 36 (FIG. 1) includes a back pressure control valve which is operable to vary the fluid pressure in the portion of the return conduit between the speed responsive control unit and the steering control valve 22. At relatively low vehicle speeds, a linear actuator in the speed responsive control unit 36 compresses a valve spring to increase a biasing force against a valve element which retards fluid flow through the return conduit 34. Therefore, at relatively low vehicle speeds, there is a relatively high fluid pressure in the portion of the return conduit 34 upstream of the speed responsive control unit 36 and in the pressure chamber 150.

At relatively high vehicle speeds, the linear actuator in the speed responsive control unit applies a relatively small biasing force against the valve element which retards fluid flow through the return conduit 34. This results in a relatively low fluid pressure in the portion of the return conduit 34 upstream of the speed responsive control unit 36 and in the pressure chamber 150. The construction and mode of operation of the speed responsive control unit 36 is the same as described in the aforementioned U.S. Pat. No. 4,819,545.

At relatively low vehicle speeds, a relatively high fluid pressure is present in the portion of the return conduit 34 upstream of the speed responsive control unit 36. This relatively high fluid pressure is communicated from the lower end (as viewed in FIG. 1) of the valve members 40 and 42 through a central passage in the inner valve member 40 and the radially extending passages 160 to the pressure chamber 150. At low vehicle speeds, the relatively high fluid pressure in the chamber 150 urges the lower reaction element 116 upwardly against the biasing spring 122.

Upon rotation of the steering wheel and inner valve member 40, the balls 120 exert a force on the upper reaction element 116. This force is added to the fluid pressure force in the chamber 150 to move the upper reaction element 116 upwardly from the initial position of FIG. 1. As this occurs, the spring 122 is compressed against a spring retainer 177 and lock ring 179 secured to the stem 50 of the inner valve member 40.

When the vehicle is travelling at a relatively high speed, relatively low fluid pressure exists in the portion of the return conduit 34 upstream from the speed responsive control unit 36. This relatively low fluid pressure in the return conduit 34 is conducted through the axially extending central passage in the inner valve member 40 and the radially extending passage 160 to the pressure chamber 150. Since the pressure in the chamber 150 is relatively low at high vehicle speeds, there is a relatively small fluid pressure force to offset the force of the spring 122. Therefore, substantial resistance is encountered in rotating the inner valve member 40 relative to the outer valve member 42.

Pressure Balancing

The power steering control valve 22 is pressure balanced. Therefore, when the inner and outer valve members 40 and 42 are in a central position, the fluid pressure conducted through the actuator conduits 28 and 30 to the power steering actuator 31 are equal. Upon rotation of the inner valve member 40 relative to the outer valve member 42 through a first distance in a clockwise direction from the central position, a first fluid pressure is conducted through one of the actuator conduits 28 or 30 to the power steering actuator 31. Similarly, upon rotation of the inner valve member 40 relative to the outer valve member 42 through the same distance in the counterclockwise direction, the same fluid pressure is conducted through the other actuator conduit 28 or 30 to the power steering actuator 31.

Even though the inner and outer valve members 40 and 42 are accurately made, even small tolerance variations in the location and/or configuration of the lands 87 and grooves 86 on the outside of the inner valve member and the lands and grooves 89 on the inside of the outer valve member 42 can effect exactly where the inner and outer valve members 40 and 42 are relative to each other in the pressure balanced central position. As a practical matter, the pressure balanced central position of the inner and outer valve members 40 and 42 is ascertained by assembling the valve members and checking the fluid pressures obtained.

When the inner and outer valve members 40 and 42 are in the central position, a relatively small amount of relative movement between the valve members effects little or no change in the fluid pressure conducted to the power steering actuator 31. However, as the extent of the relative movement between the inner and outer valve members increases, the extent of the change in pressure with an increment of relative movement increases. Therefore, it is preferred to pressure balance the power steering valve 22 by moving the inner and outer valve members 40 and 42 relative to each other.

To determine the central position, the lower end of the torsion spring 102 is fixedly connected with the follow-up member 54 and pinion 64. The inner valve member 40 is positioned on the follow-up member 54 (FIG. 4) with the torsion spring 102 extending through a central axial passage in the inner valve member. The outer valve member 42 is then telescoped over the inner valve member 40. At this time, the upper end portion of the torsion spring 102 is not connected with the inner valve member 40. Thus, the follow-up member 54, torsion spring 102, and outer valve member 42 are freely rotatable together relative to the inner valve member 40.

The inner and outer valve members 40 and 42 are then positioned in a fixture 166 (FIG. 4). Air or other fluid is conducted through a passage 170 in the fixture 166 to the central groove 80 in the outer valve member 42. The air flows through passages in the inner and outer valve members 40 and 42 to passages 172 and 174 in the fixture 166. The passages 172 and 174 correspond to the actuator conduits 28 and 30 of FIG. 1.

The follow-up member 54 is then rotated to rotate the outer valve member 42 from a preliminary initial position in which substantially equal fluid pressures are present at the passages 172 and 174 to a first actuated position. When the outer valve member 42 is in the first actuated position, a relatively high predetermined fluid pressure is present at the passage 172. Although many different fluid pressures could be selected, in one specific instance, a fluid pressure of 100 psi was selected. When the fluid pressure of 100 psi was obtained at the passage 172, the relative positions of the inner and outer valve members 40 and 42 were noted and will be referred to herein as the first actuated position.

The follow-up member 54 and outer valve member 42 are then rotated in the opposite direction relative to the stationary inner valve member 40 until the same predetermined fluid pressure is obtained at the passage 174. Thus, in the example, the outer valve 42 is rotated in the opposite direction until a fluid pressure of 100 psi is obtained at the passage 174. The relative positions of the inner and outer valve members 40 and 42 is then noted. This position is referred to herein as the second actuated position.

The outer valve member 42 is then rotated back to a central position halfway between the first and second actuated positions. Thus, the arcuate distance which the outer valve member 42 rotates from the central position to the first actuated position is equal to the arcuate distance through which the outer valve member 42 rotates from the central position to the second actuated position. Although it is preferred to rotate the outer valve member 42 relative to the inner valve member 40 to locate the central position, the inner valve member could be rotated relative to the outer valve member if desired.

Once the outer valve member 42 has been accurately located relative to the inner valve member 40 in the central position, a clamp grips an exposed end portion or knob 161 (FIGS. 4 and 6) on the outer end of the torsion bar 102 and an outer end portion of the inner valve member 40 to hold the inner and outer valve members 40 and 42 against relative movement. A hole is then drilled through the upper end portions of the inner valve member 40 and torsion bar 102. A pin is inserted into the hole to fixedly interconnect the inner valve member 40 and torsion bar 102. The knob 161 is then removed from the end of the torsion bar 102. It is contemplated that other methods of fastening the torsion bar 102 with the inner valve member 40 could be used if desired.

At this time, the inner valve member 40 and outer valve member 42 are in their central positions. Since the lower end portion of the torsion bar 102 is fixedly connected with the follow-up member 54 and outer valve member 42, the torsion bar is effective to hold the inner and outer valve members 40 and 42 in the central position and to urge the inner and outer valve members back to the central position upon relative movement between the valve members.

Once the central position of the inner and outer valve members 40 and 42 has been determined, the annular lower reaction element 126 (FIG. 5) is loosely positioned in an annular recess 180 (FIG. 8) formed by a cylindrical flange 182 at the upper end of the outer valve member 42. At this time, the lower reaction element 126 is freely movable in the annular recess 180 at the upper end of the outer valve member 42.

The balls 120 are then placed in the recesses 124 in the lower reaction element 126 (FIGS. 5 and 6) and in engagement with the recesses 130 in the inner valve member 40 (FIG. 6). The upper reaction element 116 is then telescoped over the inner valve member 40 into engagement with the balls 120 (FIG. 7). The outer seal ring 138 and inner seal 144 are then positioned in engagement with the upper reaction element 116. The spring 122 is positioned in engagement with the upper seal element 144.

A spring retainer 177 and lock ring 179 are then moved downwardly to compress the spring 122 and to press the annular surface 134 on the inside of the upper force transmitting element 116 against the balls 120. The downward and inward force applied against the balls 120 by the upper reaction element 116 forces the balls into the recesses 124 in the lower reaction element 126.

If the recesses 124 in the lower reaction element 126 are not precisely aligned with the axially extending grooves 130 (FIG. 8) in the outside of the inner valve member 40, the force applied against the balls 120 by the upper reaction element 116 will cause the balls to apply a camming force against the side surfaces of the recesses 124 in the lower reaction element 126. This camming force rotates the lower reaction element 126 in the annular recess 180 (FIG. 8) in the upper end portion of the outer valve member 42. Rotational movement of the lower reaction element 126 results in the recesses 124 in the lower reaction element being precisely aligned with the recesses 130 in the inner valve member 40 when the inner and outer valve members are in the central position.

The precise spatial relationship between the inner and outer valve members 40 and 42 when they are in the hydraulically balanced central position must be determined for each pair of inner and outer valve members. Therefore, it is impossible to accurately position the lower reaction element 126 relative to the outer valve member 42 before the hydraulically balanced central position of the inner and outer valve members has been determined by a fluid pressure testing operation. This is because the longitudinal central axes of the grooves 130 in the inner valve member 40 must be aligned with the radially extending central axes of the recesses 124 in the lower reaction element 126 when the inner and outer valve members 40 and 42 are in the central position. Therefore, the precise position of the lower reaction element 126 relative to the outer valve member 42 will vary slightly as a function of variations in the position of the outer valve member 42 relative to the inner valve member 40 when the inner and outer valve members are in their hydraulically balanced initial position.

Once the lower reaction element 126 has been accurately positioned relative to the outer valve member 42 by applying a force against the balls 120 with the upper reaction element 116, the outer valve member 42 is deformed to grip the lower reaction element and hold it against movement relative to the outer valve member. To securely grip the lower reaction element 126, the cylindrical flange 182 (FIGS. 7 and 8) is plastically deformed radially inwardly by four tools 184 (FIG. 7) which are spaced apart by 90 degrees around the periphery of the flange 182. The tools 184 partially circumscribe the annular flange 182 so that the material of the flange is firmly pressed radially inwardly throughout a portion of the flange when the tools are pressed against the flange in the direction of the arrows 188 and 190 in FIG. 7. As the flange 182 is deformed radially inwardly by the tools 184, material of the flange wall 182 grips serrations in the outer side surface of the lower reaction element 126.

Various other methods of securing the lower reaction element 126 to the cylindrical flange 182 or to the outer valve member 42 could be used. These other methods include other known methods of plastically deforming the flange 182, adhesive, welding, etc. Each of this broad attachment methods includes a variety of techniques.

When the power steering control valve 22 is assembled in this manner, the power steering control valve is both hydraulically and mechanically balanced. Thus, upon actuation of the power steering control valve 22 through a given distance in either a clockwise or counterclockwise direction, the same fluid pressure is directed to chamber 72 or 74 of the power steering actuator 31. When the inner and outer valve members 40 and 42 are rotated in the clockwise or counterclockwise directions relative to each other through the same distance and at a constant vehicle speed, the force transmitting assembly 114 resists relative rotation with the same force.

The initial position in which the inner and outer valve members 40 and 42 are pressure balanced can only be determined by testing the inner and outer valve members 40 and 42. Therefore, the position of the lower reaction element 126 relative to the outer valve member 42 can only be determined after the pressure balanced initial position of the inner and outer valve members has been determined. This is because the force transmitting elements or balls 120 cooperate with recesses 124 in the lower reaction element 126 and with recesses 130 in the inner valve member 40.

Operation

Figure 8:
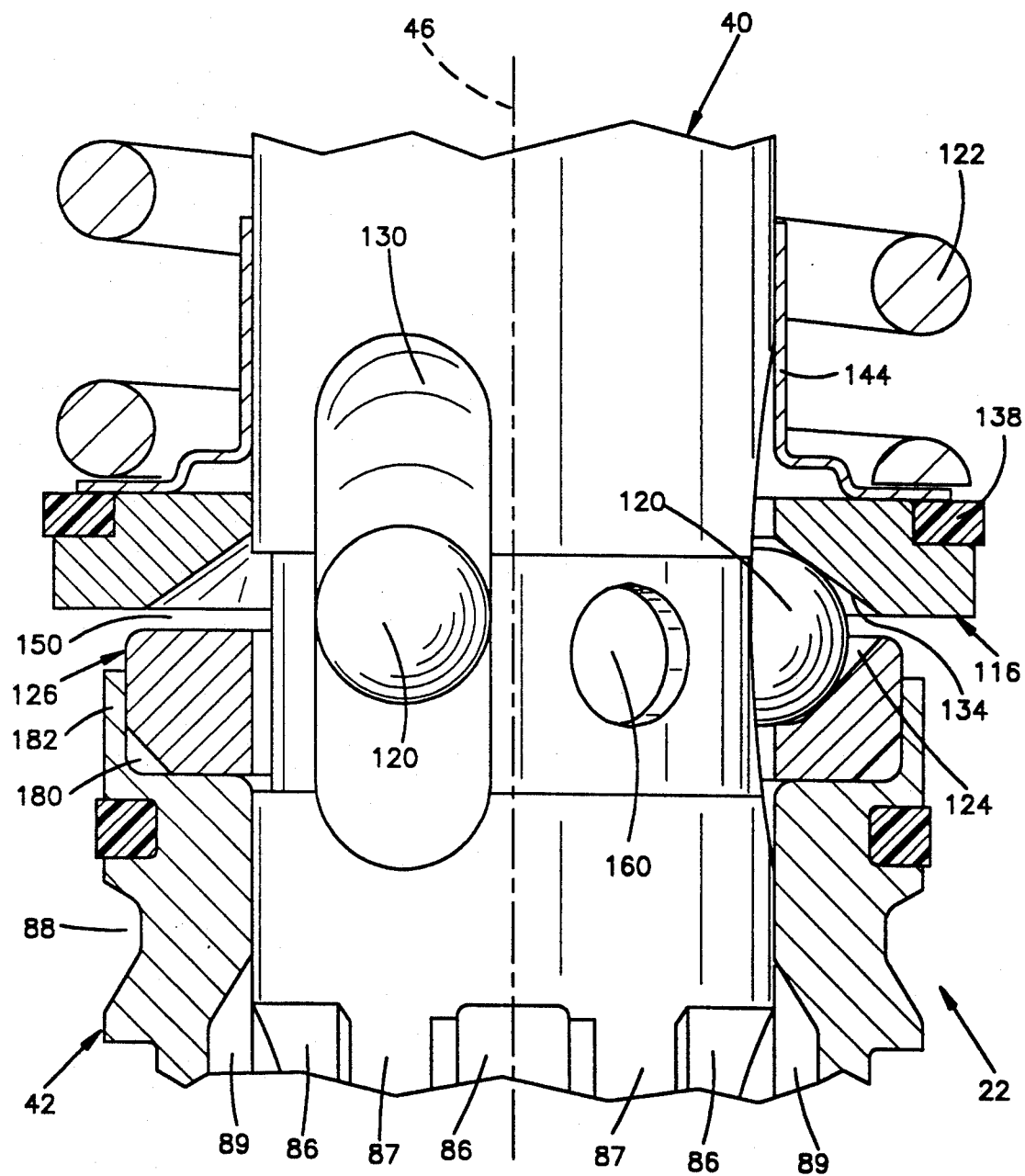
FIG. 8 is an enlarged fragmentary illustration depicting the relationship between the inner and outer valve members and force transmitting assembly when the inner and outer valve members are in the initial position.

When the inner and outer valve members 40 and 42 are in the initial position illustrated in FIG. 8, the three force transmitting elements or balls 120 are urged into recesses 124 in the lower reaction element 126 and into recesses 130 in the inner valve member 40 by the upper reaction element 116. The force applied against the upper reaction element 116 by the spring 122 presses the annular side surface 134 on the upper reaction element against the three balls 120. The inner side surface 134 on the upper reaction element 116 is formed as a portion of a cone and forces the balls 120 both downwardly and inwardly (as viewed in FIG. 8). Thus, downward force components are applied against the balls 120 by the upper reaction element 116 to urge the balls into the recesses 124 in the lower reaction element 126. Similarly, radially inwardly force components applied against the balls 120 by the surface 134 on the upper reaction element 116 to urge the balls into the recesses 130 formed in the inner valve member 40.

The force transmitting assembly 114 accurately positions the inner and outer valve members 40 and 42 relative to each other. Thus, the lower reaction element 126 is fixedly secured to the outer valve member 42 with the recesses 124 in the lower reaction element precisely aligned with the recesses 130 in the inner valve member 40. Therefore, the balls 120 cooperate with the lower reaction element 126 and inner valve member 40 to accurately position them in a central position in which equal fluid pressures are present in the chambers 72 and 74 of the power steering actuator 31.

When the inner valve member 40 is rotated relative to the outer valve member 42 (FIG. 9), the balls 120 rotate with the inner valve member 40 about the central axis 46 of the power steering valve 22. As the balls 120 rotate about the axis 46 with the inner valve member 40, the balls roll up or are cammed up the side surfaces of the recesses 124 in the lower reaction element 126. As this occurs, the balls 120 move upwardly in the recesses 130 in a direction parallel to the central axis 46 of the power steering valve.

Figure 9:
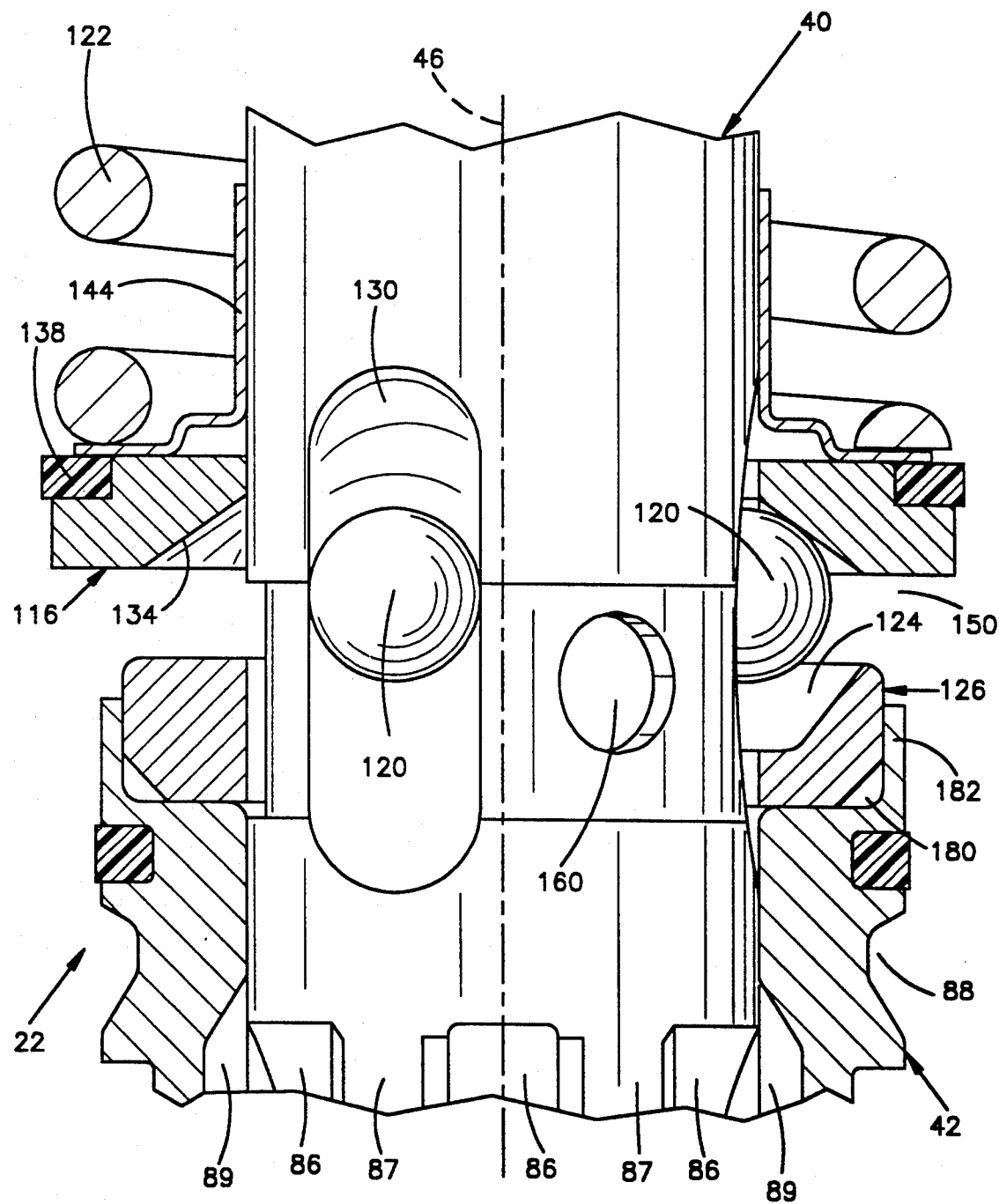
FIG. 9 is an enlarged fragmentary illustration, generally similar to FIG. 8, depicting the relationship between the inner and outer valve members and the force transmitting assembly after the inner and outer valve members have been actuated from the initial position.

As the balls 120 are cammed upwardly by the surfaces of the recesses 124 in the lower reaction element 126, the balls move part way out of the recesses in the lower reaction element. As this occurs, the balls 120 force the upper reaction element 116 upwardly away from the lower reaction element 126 against the influence of the spring 122 (FIG. 9). The force which the balls 120 must transmit to the upper reaction element 116 to overcome the biasing force of the spring 122 varies as a function of vehicle speed. This is because the fluid pressure in the chamber 150 (FIGS. 1 and 2) varies as a function of vehicle speed. The greater the vehicle speed, the lower the pressure in the chamber 150 and the greater the force which the balls 120 must apply to the upper reaction element 116 to move the upper reaction element away from the lower reaction element 126.

From the above description of the invention, those skilled in the art will perceive improvements, changes and modifications. Such improvements, changes and modifications within the skill of the art are intended to be covered by the appended claims.

Having described a preferred embodiment of the invention, the following is claimed:

1. A method of assembling an apparatus for use in controlling fluid flow to a power steering actuator in a vehicle and having first and second relatively rotatable valve members and a force transmitting assembly for resisting relative rotation between the first and second valve members, said method comprising the steps of:

interconnecting the first and second valve members in a central position relative to each other with a spring which is deflectable by relative rotation between the first and second valve members from their central position and is effective to urge the first and second valve members back to the central position upon relative rotation between the first and second valve members;

positioning first and second reaction elements relative to the first and second valve members with a plurality of force transmitting elements disposed between the first and second reaction elements, said step of positioning the first and second reaction elements and force transmitting elements relative to the first and second valve members including positioning the first reaction element relative to the first valve member and loosely positioning the second reaction element relative to the second valve member;

locating the second reaction element in a desired position relative to the second valve member, said step of locating the second reaction element in a desired position relative to the second valve member includes moving the second reaction element relative to the second valve member under the influence of force applied against the second reaction element by the force transmitting elements if the second reaction element is in a position relative to the second valve member other than the desired position; and, thereafter, connecting the second reaction element with the second valve member while the first and second valve members are in the central position relative to each other and while the second reaction element is in the desired position relative to the second valve member.

2. A method as set forth in claim 1 wherein said step of connecting the force transmitting assembly with the first and second valve members includes connecting the force transmitting assembly with the first valve member with the force transmitting assembly disposed in a predetermined position relative to the first valve member and in a position relative to the second valve member which is at least partially determined by and varies as a function of the position of the second valve member relative to the first valve member when the first and second valve members are in the central position.

3. A method as set forth in claim 1 wherein said step of determining a central position for the first and second valve members includes conducting fluid pressure to an inlet port connected in fluid communication with the first and second valve members, rotating the first and second valve members in a first direction relative to each other to a first actuated position in which a predetermined fluid pressure is present at a first control port, rotating the first and second valve members in a second direction relative to each other to a second actuated position in which the predetermined fluid pressure is present at a second control port, and selecting a position midway between the first and second actuated positions as the central position.

4. A method as set forth in claim 1 wherein said step of locating the second reaction element in a desired position relative to the second valve member includes pressing the force transmitting elements against side surface areas of recesses formed in the second reaction element to move the second reaction element relative to the second valve member under the influence of force applied against the side surface areas of the recesses if the second reaction element is in a position relative to the second valve member other than the desired position.

5. A method of assembling an apparatus for use in controlling fluid flow to a power steering actuator in a vehicle and having first and second relatively rotatable valve members and a force transmitting assembly for resisting relative rotation between the first and second valve members, said method comprising the steps of:

determining a central position for the first and second valve members by rotating the first and second valve members relative to each other to obtain preselected fluid pressures at a plurality of control ports;

interconnecting the first and second valve members when they are in the central position relative to each other with a spring which is deflectable by relative rotation between the first and second valve members from their central position and is effective to urge the first and second valve members back to the central position upon relative rotation between the first and second valve members; and thereafter, connecting the force transmitting assembly with the first and second valve members, said step of connecting the force transmitting assembly with the first and second valve members including positioning first and second reaction elements relative to the first and second valve members with a plurality of force transmitting elements disposed between the first and second reaction elements, said step of positioning the first and second reaction elements relative to the first and second valve members including positioning the first reaction element relative to the first valve member and loosely positioning the second reaction element relative to the second valve member, applying force against the second reaction element with the force transmitting elements to locate the second reaction element relative to the first and second valve members while the first and second valve members are in the central position relative to each other, and, thereafter, connecting the second reaction element with the second valve member while the first and second valve members are in the central position relative to each other.

6. A method as set forth in claim 5 wherein said step of connecting the second reaction element with the second valve member includes deforming an annular flange portion of the second valve member to grip a circular outer side surface of the second reaction element with the second valve member.

7. A method as set forth in claim 5 wherein said step of positioning the first and second reaction elements relative to the first and second valve members includes engaging a plurality of recesses in the first valve member with the force transmitting elements to position the force transmitting elements relative to the first valve member.

8. A method as set forth in claim 5 wherein said step of applying force against the second reaction element with the force transmitting elements includes applying force against the force transmitting elements with the first reaction element to press the force transmitting elements against the second reaction element.

9. A method of assembling an apparatus for use in controlling fluid flow to a power steering actuator in a vehicle and having first and second relatively rotatable valve members and a force transmitting assembly for resisting relative rotation between the first and second valve members, said method comprising the steps of:
  interconnecting the first and second valve members in a central position relative to each other with a spring which is deflectable by relative rotation between the first and second valve members from their central position and is effective to urge the first and second valve members back to the central position upon relative rotation between the first and second valve members;
  positioning first and second reaction elements relative to the first and second valve members with a plurality of force transmitting elements disposed between the first and second reaction elements, said step of positioning the first and second reaction elements and force transmitting elements relative to the first and second valve members including positioning the first reaction element relative to the first valve member and loosely positioning the second reaction element relative to the second valve member;
  locating the second reaction element in a desired position relative to the second valve member; and,
  thereafter, connecting the second reaction element with the second valve member while the first and second valve members are in the central position relative to each other and while the second reaction element is in the desired position relative to the second valve member, said step of connecting the second reaction element with the second valve member including deforming a portion of the second valve member to grip the second reaction element with the second valve member.

10. A method as set forth in claim 9 wherein said step of loosely positioning the second reaction element relative to the second valve member includes positioning the second reaction element in a recess formed in the second valve member, said step of connecting the second reaction element with the second valve member including pressing a side surface area of the recess in the second valve member against an outer side surface area of the second reaction element.

11. A method as set forth in claim 9 further including the steps of determining a central position for the first and second valve members by rotating the first and second valve members relative to each other to obtain preselected fluid pressures at a plurality of control ports prior to performance of said step of interconnecting the first and second valve members.

12. A method of assembling an apparatus for use in controlling fluid flow to a power steering actuator in a vehicle and having first and second relatively rotatable valve members and a force transmitting assembly for resisting relative rotation between the first and second valve members, said method comprising the steps of:
  interconnecting the first and second valve members in a central position relative to each other with a spring which is deflectable by relative rotation between the first and second valve members from their central position and is effective to urge the first and second valve members back to the central position upon relative rotation between the first and second valve members;
  positioning first and second reaction elements relative to the first and second valve members with a plurality of force transmitting elements disposed between the first and second reaction elements, said step of positioning the first and second reaction elements and force transmitting elements relative to the first and second valve members including positioning the first reaction element relative to the first valve member and loosely positioning the second reaction element relative to the second valve member;
  locating the second reaction element in a desired position relative to the second valve member; and,
  thereafter, connecting the second reaction element with the second valve member while the first and second valve members are in the central position relative to each other and while the second reaction element is in the desired position relative to the second valve member, said step of locating the second reaction element in a desired position relative to the second valve member including transmitting force from the force transmitting elements to the second reaction element while the first and second valve members are in the central position relative to each other.

13. A method as set forth in claim 12 wherein said step of transmitting force from the force transmitting elements to the second reaction element includes transmitting force from the first reaction element to the force transmitting elements.

14. A method of assembling an apparatus for use in controlling fluid flow to a power steering actuator in a vehicle and having first and second relatively rotatable valve members and a force transmitting assembly for resisting relative rotation between the first and second valve members, said method comprising the steps of:
  determining a central position for the first and second valve members by rotating the first and second valve members relative to each other to obtain preselected fluid pressures at a plurality of control ports;
  interconnecting the first and second valve members when they are in the central position relative to each other with a spring which is deflectable by relative rotation between the first and second valve members from their central position and is effective to urge the first and second valve members back to the central position upon relative rotation between the first and second valve members; and
  thereafter, connecting the force transmitting assembly with the first and second valve members, said step of connecting the force transmitting assembly with the first and second valve members including deforming the second valve member to fixedly connect the second valve member with the force transmitting assembly.

* * * * *